United States Patent

[11] 3,601,646

[72] Inventors Roy Leonard Balke
Erie;
George Edward Brissey, Harborcreed, both of, Pa.
[21] Appl. No. 9,149
[22] Filed Feb. 6, 1970
[45] Patented Aug. 24, 1971
[73] Assignee General Electric Company

[54] ROTOR COIL END TURN BRACING AND INSULATION SYSTEM
3 Claims, 3 Drawing Figs.

[52] U.S. Cl. ................................................. 310/270
[51] Int. Cl. ................................................. H02k 3/46
[50] Field of Search ..................................... 310/43, 260, 270

[56] References Cited
UNITED STATES PATENTS

| | | | |
|---|---|---|---|
| 2,885,581 | 5/1959 | Pileggi .......................... | 310/260 |
| 3,047,756 | 7/1962 | Coggelshall .................. | 310/270 X |
| 3,488,837 | 1/1970 | Massouda et al. ............ | 310/43 X |

*Primary Examiner*—D. X. Sliney
*Attorneys*—I. David Blumenfeld, Frank L. Neuhauser, Oscar B. Waddell and Joseph B. Forman

ABSTRACT: An end turn bracing arrangement for the rotor of dynamo electric machine in which a glass fiber rope consisting of glass fibers surrounded by woven glass sleeve is passed through the end turns of the rotor to form a circular hoop within the end turns. The glass hoop may, if desired, be held against the end turns, by means of a fiberglas lacing braid which is wound around the end turns and the hoop to anchor the glass fiber hoop firmly against the copper conductors. The entire assembly is then dipped in an epoxy resin which is cured to form a rigid, unitary structure consisting of the glass hoop, the end turns, the glass lacing and the cured resin.

PATENTED AUG 24 1971  3,601,646

INVENTORS
GEORGE E. BRISSEY
ROY L. BALKE
BY
I. David Blumenfeld
ATTORNEY

ROTOR COIL END TURN BRACING AND INSULATION SYSTEM

This invention relates to a method and apparatus for bracing the end turns of a dynamo electric machine and, more particularly, to one which provides rigid support with a minimum of weight and complexity.

In dynamo electric machines such as high speed aircraft generators, for example, a great deal of care must be taken to protect the end turns on the rotating member of the machine against the effects of centrifugal force. In the past, it has been customary to provide a metallic band which is mounted over the end turns to exert radial pressure on the end turns to constrain them against the effects of the centrifugal forces produced by rotation of the member. These metallic banding techniques usually involve placing an insulating cylinder over the end turn conductors and a metal band over the insulating cylinder. Such bracing of the end turns by metallic banding is well-known and has been utilized for a substantial period of time and has proved to be a useful and a relatively effective arrangement. However, there are a number of shortcomings to this approach which make it a less than ideal solution.

For example, in using metallic bands for end turn bracing a great deal of care must be taken in forming the end turns to make sure that the upper sides of the end turns are horizontal. If the upper sides of the end turns are not horizontal, the metallic band is not coaxial with the axis of rotation but is canted or tilted. As a result, the banding can slip off during operating and can do a great deal of damage to the machine. Thus, banding techniques add complexity and cost to the manufacturing process, while at the same time, introducing reliability problems because of the possibility of the metallic band disengaging from the end turns.

In addition, because the band is concentric with and surrounds the end turns, the end turns are essentially enclosed and are not readily accessible to the flow of cooling air or liquids so that the cooling of the end turns of the rotating member is made more difficult. Furthermore, since the band exerts substantial radial pressures on the conductors the stress applied between the top and bottom conductors of the end turns may be quite large and could produce interphase shorts between end turns. As a result, it is necessary to provide interphase insulation between the conductors thereby adding another manufacturing step, additional material to the assembly.

It is of course, also apparent, that the use of a metallic band to hold the end turns adds to the weight of the entire assembly and in those applications where weight is a critical factor, as for example, in generators for aerospace usage, this constituted a very definite disadvantage.

It is therefore, a primary objective of the instant invention to provide an end turn bracing arrangement which holds the end turns rigidly in place while at the same time, reducing the weight and complexity of the bracing arrangement.

Another objective of this invention is to provide an end turn bracing arrangement which is light in weight and of generally open configuration to enhance colling of the end turns during operation.

Yet other objectives and advantages of the instant invention will become apparent as the description thereof proceeds.

The various advantages and objectives of the invention are realized by means of an end turn bracing construction in which the end turns of a rotor are firmly secured against the forces acting on the end turn by means of a resin impregnated hoop which passes circumferentially through the inside, or "-nose" of the end turns. The glass hoop is anchored firmly against the conductors by woven glass lacing braid which is wound around the conductors and the hoop. This assembly is immersed in a polymer resin and the assembly cured to form a rigid, unitary structure consisting of the circular loop, glass lacing, conductors and the cured resin. By this means, the end turns are firmly braced against centrifugal forces. At the same time, an open configuration is provided for ease of cooling and one which is light in weight and simple to manufacture.

Other features believed characteristic of this invention are set forth in particularity in the appending claims. The invention itself, however, together with further objects and advantages thereof will be best understood by reference to the following description taken in conjunction with the accompanying drawings in which:

Figure 1:
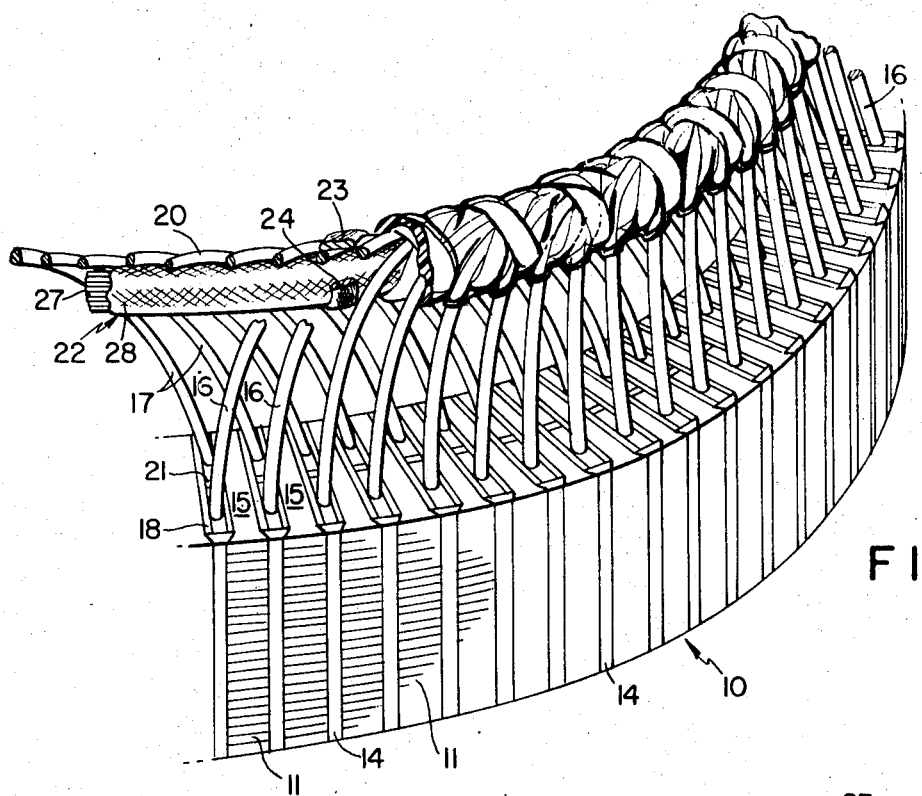
FIG. 1 is a partial perspective view of a rotor assembly incorporating the invention.
Figure 3:
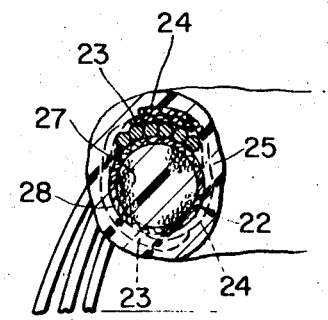
FIG. 3 is a sectional view taken along lines 3—3 of FIG. 2.
Figure 2:
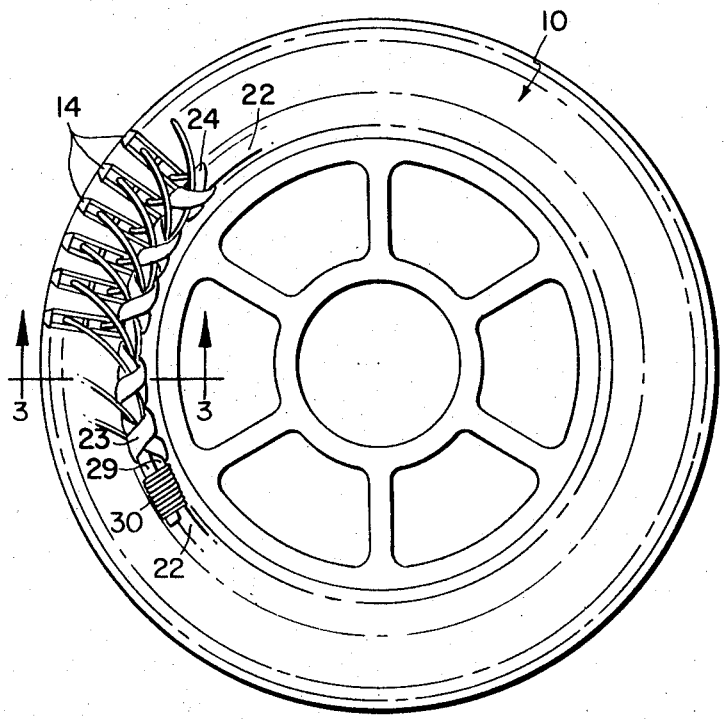
FIG. 2 is an elevation (end) view of a rotor assembly.

As shown in FIG. 1 and 2, the rotor assembly generally designated at 10, includes a plurality of laminations 11 arranged in the usual manner to form the core of the device. The core is provided with axially extending slots 14 containing coils 15. Each of the coils 15 has a top coil side 16 and a bottom coil side 17 disposed in the slots in the usual manner and insulated from the metallic slot walls by the slot tubes 18. The machine shown for illustration in FIG. 1 is one for 3-phase operation. However, the principle of the invention is obviously applicable to a machine wound for any number of phases.

As is common practice, each coil has one side placed in the bottom of a first slot, is reversely bent to form an end turn, shown and designated generally at 20, and reenters the top of a second slot displaced from the first by a number of slots determined by the winding arrangement to be utilized. Since all of the coils are reversely bent and placed in the core in this manner, all of the end turns of the assembly are in overlapping relationship. Insulation between the coils disposed within the same slot is provided by means of a liner 21 which extends axially the entire length of the slot and may extend partially beyond the end of the slot.

Depending on the voltage rating of the machine, interphase insulation between the individual windings may not be required because with the end turn bracing arrangement of the invention, very little, if any, radial pressure is exerted on the windings to force them against each other. That is, where a steel band or the like is utilized to hold the end turns, large forces are exerted by the steel band on the conductors. Consequently, there is the possibility of interphase shorts between conductors. Interphase insulation between the conductors is usually required to prevent shorting between end turns. However, in the instant case, as will be explained in detail below, no such radial forces are exerted on the end turns and hence, at lower voltage ratings, the interphase insulation may, in most instances, be dispensed with.

As shown in FIG. 1, end turns 20 are firmly braced against movement due to centrifugal forces by the circular glass hoop 22, made up of a bundle of glass fibers mounted within a braided or woven glass sleeve. A means for anchoring the glass hoop to the conductors may be provided in the form of a pair of braided fiberglass laces 23 and 24, although they may be dispensed with in many circumstances. One of the the laces is wound in a clockwise spiral around both the end turn conductors and rope 22 to anchor the rope firmly to the copper conductors, while the other one is wound in a counterclockwise spiral. The entire assembly, hoop, laces and end turns are then impregnated in a composition shown generally at 25 which holds the entire assembly rigidly and is also capable, when cured, of withstanding high temperatures in excess of 200° C. and which is also resistant to oil or other machine cooling liquids and vapors.

Hoop 22 consists of a glass rope made of a plurality of glass fibers 27 held within a loosely woven glass sleeve 28. The fiberglas sleeve and the glass fibers contained therein are untreated and sleeve 28 is woven to permit impregnation thereof by the polymeric impregnating material 25. Such fiberglas ropes are well known and available in many sizes and from many sources. However, one example of such a glass rope used to form the end turn bracing hoop was 0.118 inches diameter rope sold by the Bentley-Harris Corp. of Conshohocken, Pa. under their trade designation BH-111188BEN-HAR overbraided, untreated fiberglas core. As coils 15 are inserted into slots 14 and end turns 20 shaped by reverse bending the conductors, one end of glass rope 22 is fed through the end turns. As more and more of the end turns are formed, the glass rope is fed through the end turns until the entire assembly is finished and complete hoop, which is partially overlapped, (as shown most clearly in FIG. 2) is formed. The amount of overlap is not critical and should be sufficient to prevent the hoop from coming apart under the influence of centrifugal force.

Braided glass laces 23 and 24 are then wound spirally over end turns 20 and hoop 22 and fastened in any suitable manner as shown at 30. That is, one glass lace is wound in one direction, clockwise for example, completely around the end turns and the glass hoop. The second lace is then wound in an opposite fashion to produce a crossover binding between the hoop, the conductors and the laces thereby firmly anchoring the rope or hoop 22 to the end turns of the conductor. The winding pitch of laces 23 and 24 is not critical and is chosen simply to provide proper anchoring of the hoop to the copper. Braided fiberglas lacing of the type illustrated at 23 and 24 is well known and available from various commercial sources. One form of a commercial available braided glass lacing is an 0.125 inch by 0.016 inch untreated flat braid sold by the Bentley-Harris Co. of Conshohocken, Pa. under their trade designation Pyrolace style FE40 Flat Braid.

The end turn bracing assembly consisting of the lacing, the wire and the rope is then dipped in a polymeric impregnating material and cured to form a rigid mass which binds the end turns and the glass rope and lacings, each of which has been impregnated by the resin to form the unitary, rigid, light weight open structure for bracing the end turns.

An additional advantage associated with the end turn bracing arrangement just described is that end turns 20 may be shaped so that they are tipped or angled downwardly toward the rotor shaft to reduce centrifugal loading. That is, the upper side of the end turn winding need not be horizontal but may be inclined at some angle to the horizontal towards the axis of rotation. By tipping or angling the end turns downwardly the average diameter of the end turn is reduced thereby reducing the peripheral speed of the end turns for a given rotor speed. This, in turn, of course, reduces the forces acting on the end turns thereby permitting, at least from this standpoint, higher speeds for a given size and volume of dynamoelectric machine.

The impregnating composition shown generally at 25 may be one of a number of well known commercially available high temperature impregnating compositions such as, for example, epoxylated Novolac resins and bisphenol-epichlorohydrin polymers. Examples of the latter material are sold under the trade name EPON-826 or 828 by the Shell Chemical Co., the Araldite Epoxy resins a such as Araldite 6005 or 60010 sold by the Ciba Co., Inc., the EPI-REZ Epoxy Resins such as EPI-REZ 580 and 540 sold by the Jones-Dagney Co. and other well known epoxy resins. Suitable curing agents provide high temperature compositions, for example, are hexanydrophthalic anhydride (HHPA) and methylated maleic acid adduct of phthalic anhydride as well as other curing agents of similar capacity which are well known to those skilled to the art. For further details of suitable epoxy resins, epoxylated novolac resins and the curing agents therefor may be had by reference to the book entitled "Epoxy Resins" published in 1957 by the McGraw Hill Book Co., Inc. New York, N.Y.

It will be understood, of course, that different resinous compositions may require different temperatures to obtain the desired cure and the temperature and sequence of events to be described presently below, forms one arrangement of temperatures for producing the desired curing as well as the preferred embodiment for fabricating the end turns bracing arrangements of the instant invention.

The end turn bracing arrangement of the instant invention may be assembled in the following manner:

First, the rotor is formed out of the laminations and the slots are insulated. Coils 15 are placed in each of the slots 14. The end turns of the coils extending beyond the end of the slot are then shaped and formed. As each coil is thus inserted in the slot and shaped one end of the untreated glass rope containing the longitudinal fibers in an untreated glass braid is laced in the interior of the coil end turns. The rope is laced through the interior or the "nose" of the end turns until the entire rotor is assembled and a glass hoop is formed on the inside of the end turns with the loop partially overlapped to provide additional strength.

The end turns are then further shaped to "tip" or bend them inwardly at an angle towards the axis of rotation or the shaft of the rotor.

Hoop 22 is then anchored firmly against the end turns by winding an untreated fiberglas lace 23 clockwise around the end turns and the top so that in one instance, the pitch is equal to two rotor slot positions.

Another untreated fiberglas flat lace 24 is wound counterclockwise providing a crossover arrangement of the supporting or anchoring lacings 23 and 24. The two lacings are then secured either by knotting or other suitable fastening means.

The laced assembly now comprising the circular hoop, the end turns and the crossed over glass braided laces are subjected to an impregnation treatment which, in fact, may be any one of a number of well known techniques to provide covering of these elements and to provide a rigid unitary bracing structure. These impregnating techniques may constitute any one of a number of well known prior art techniques such as successive dipping and baking, vacuum or impregnation brushing or the like. However, the preferred method is as follows:

After the assembly steps described above, the entire assembly is washed in a suitable liquid such as Freon vapor, for example, to remove all oils and greases which may have collected on the hoop, lacings or end turns. The part is then preheated for a period of 1 hour at 160°±5° C. The polymer which in this instance was an epoxylated novolac resin is then preheated to 55° C. The assembled rotor is then cooled to 55° C. in any suitable manner. The hoop, lacings are dipped in the resin. After vacuum impregnation, the assembly is baked for 10 to 15 minutes at 200° C. After this period of baking and after any excess of polymer is removed, the rotor is baked for 3 hours at a temperature of 160° C.±5° C. Thereafter, it is baked for an additional 4 hours at 200° C.±50° C. to complete the curing process.

An alternative embodiment is possible in which the glass fiber hoop is positioned on the outside of end turns. In this instance, after end turns 20 of the entire rotor are formed, a glass fiber hoop of the same construction as that shown in FIG. 1 is placed against the outside of the end turns. A pair of flat glass fiber laces are wound in opposite directions around the conductors and hoop and fastened together at their ends. The laces anchor the hoop firmly against the conductors and the entire assembly encapsulated to form a rigid, unitary end turn bracing structure.

While several embodiments of the apparatus and process of this invention have been shown, it will be understood, of course, that it is not limited thereto since many modifications in the arrangement and the sequence of steps may be made. It is contemplated by the appended claims to cover any such modifications as fall within the true spirit and scope of this invention.

What we claim as new and desired to be secured by Letters Patent of the United States is:

1. A bracing and support arrangement for the end turns of a rotating member of a dynamoelectric machine of the type including a magnetic core having a plurality of coil retaining slots and coils disposed in said slots and having end turns extending beyond the core, a. a circular fiberglas hoop abutting against and positioned on the inside of the ends of said end turns, b. means for anchoring said hoop to the ends of said end turns, including glass lacing means wrapped spirally around the entire hoop and the end turns, c. a mass of cured, resinous material, intimately bonding the ends of said end turns and said hoop and impregnating said hoop whereby a portion of the end turns remains open to facilitate cooling while restraining the end turns against movement due to centrifugal forces.

2. The bracing means of claim 1 in which said lacing means comprises two glass laces wound oppositely around the hoop and end turns.

3. The bracing arrangement according to claim 1 in which the end turn configuration is tipped towards the axis of rotation of the rotating member.